United States Patent
Hongo et al.

[11] Patent Number: 5,723,967
[45] Date of Patent: Mar. 3, 1998

[54] METHOD OF STARTING A BRUSHLESS MOTOR FOR DRIVING A COMPRESSOR IN A REFRIGERATING CYCLE

[75] Inventors: Ichiro Hongo; Nobuo Matsui, both of Yokohama; Takao Hoshi, Fuji, all of Japan

[73] Assignee: Kabushiki Kaisha Toshiba, Kawasaki, Japan

[21] Appl. No.: 506,048

[22] Filed: Jul. 24, 1995

Related U.S. Application Data

[63] Continuation of Ser. No. 229,641, Apr. 19, 1994, abandoned.

[30] Foreign Application Priority Data

Apr. 23, 1993 [JP] Japan ................. 5-098097

[51] Int. Cl.[6] ............................................. H02K 23/00
[52] U.S. Cl. .................... 318/254; 318/439; 318/701; 318/721; 318/722
[58] Field of Search ...................... 318/778–797, 318/700–724, 138, 254, 439

[56] References Cited

U.S. PATENT DOCUMENTS

| | | | |
|---|---|---|---|
| 3,772,526 | 11/1973 | Alwers | 290/38 |
| 3,798,522 | 3/1974 | Pisecher et al. | 318/718 |
| 4,443,747 | 4/1984 | Chausse et al. | 318/723 |
| 4,565,957 | 1/1986 | Gary et al. | 318/722 |
| 4,743,815 | 5/1988 | Gee et al. | 318/254 |
| 5,017,845 | 5/1991 | Carobolante et al. | 318/138 |
| 5,225,759 | 7/1993 | Endo et al. | 318/778 |

FOREIGN PATENT DOCUMENTS 3-235695  10/1991  Japan.

OTHER PUBLICATIONS

Patent Abstracts of Japan, vol. 17, No. 47 (E–1313) Jan. 28, 1993 (abstract of JP-A-04 261 388, published Sep. 17, 1992).

*Primary Examiner*—David S. Martin
*Attorney, Agent, or Firm*—Foley & Lardner

[57] ABSTRACT

In a method of controlling start of a refrigerant-circulating compressor driven by a brushless motor in a refrigerating cycle, the brushless motor is started in accordance with an asynchronous forced commutation operation without use of rotor position detection signals; and when the rotor position detection signals can be detected a predetermined number of times or more due to synchronous commutations during the forced commutation operation, the asynchronous forced commutation operation is shifted to a synchronous commutation starting operation with the use of the rotor position detection signals.

6 Claims, 9 Drawing Sheets

PRIOR ART

FIG.11

PRIOR ART

METHOD OF STARTING A BRUSHLESS MOTOR FOR DRIVING A COMPRESSOR IN A REFRIGERATING CYCLE

This application is a continuation of application Ser. No. 08/229,641, filed Apr. 19, 1994 now abandoned.

FIELD OF THE INVENTION

The present invention relates to a method of controlling start of a compressor driven by a brushless motor at variable speed in a refrigerating cycle.

DESCRIPTION OF THE PRIOR ART

Recently, a compressor driven by a brushless motor at variable speed is used for a refrigerating cycle apparatus. In this brushless motor, a permanent magnet is used as a rotor to detect angular positions of the rotor, and the rotor is driven by switching the phases of voltages applied to three phase windings cyclically on the basis of the detected angular position signals of the rotor. The motor of this sort has been widely used more and more recently, because of such an advantage as a low power loss or a low heat generation (i.e., a low heat loss of the rotor), as compared with induction motors (excellent in durability).

The refrigerating cycle apparatus which uses the motor of this sort and a power system for driving the same will be described hereinbelow with reference to FIG. 9, in which the refrigerating cycle apparatus is applied to an air conditioning machine.

Figure 9:
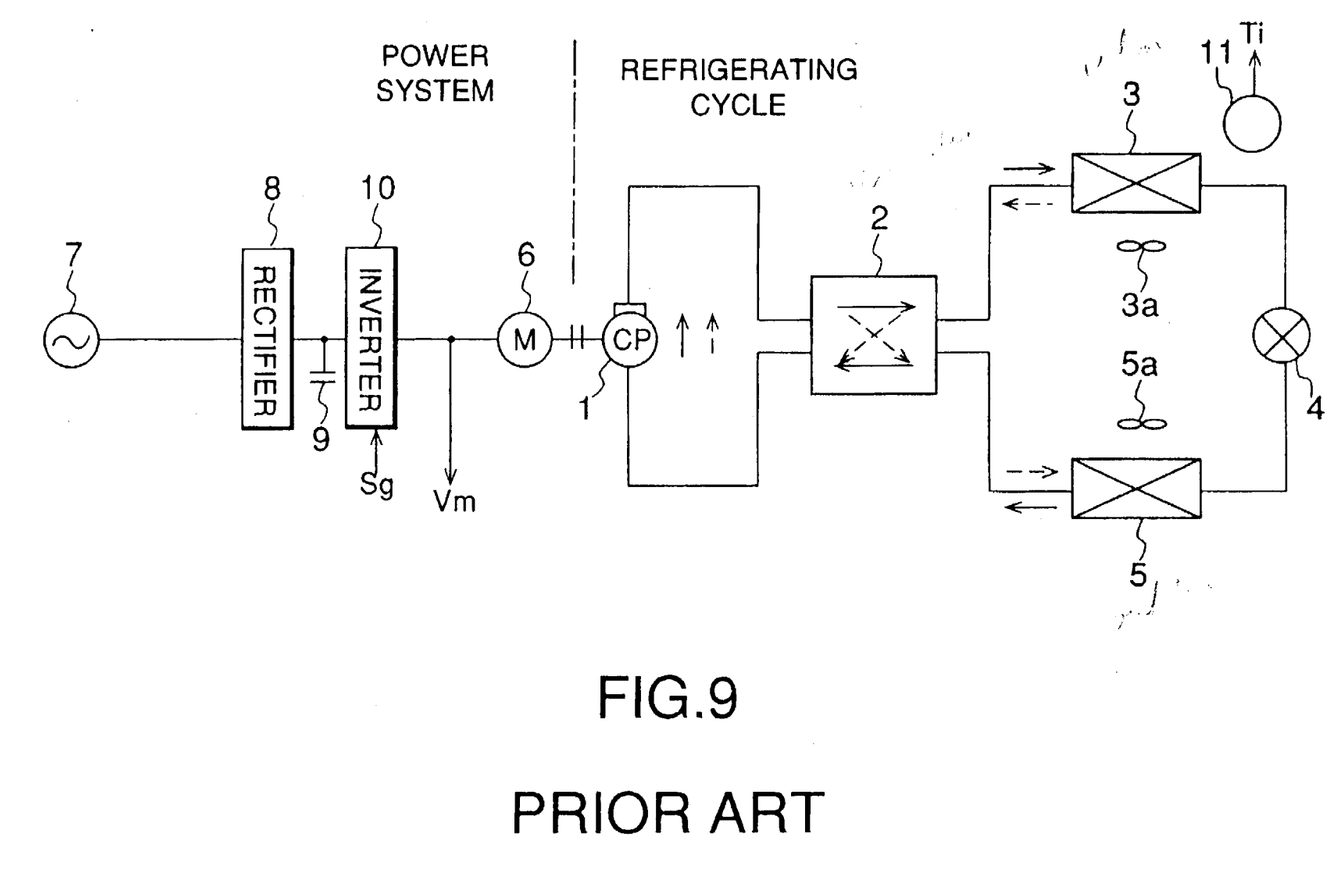
FIG. 9 is a block diagram showing a prior art refrigerating cycle apparatus and a power system for driving the same apparatus.

In FIG. 9, the refrigerating cycle apparatus can be switched from a heating operation to a cooling operation or vice versa by the switching operation of a four-way switching valve 2. In the heating operation, as shown by the solid lines, a refrigerant (cooling medium) is circulated from a compressor 1 to the same compressor 1 by way of a four-way switching valve 2, an indoor heat exchanger 3, an expansion valve 4, an outdoor heat exchanger 5 and the four-way switching valve 2. Further, in the cooling operation, as shown by the dashed lines, the refrigerant (cooling medium) is circulated from the compressor 1 to the same compressor 1 by way of the four-way switching valve 2, the outdoor heat exchanger 5, the expansion valve 4, the indoor heat exchanger 4 and the four-way switching valve 2. Further, the indoor heat exchanger 3 is provided with an indoor fan 3a for feeding warm wind (in the heating operation) or cool wind (in the cooling operation) into a room to be air-conditioned, and the outdoor heat exchanger 5 is provided with an outdoor fan 5a for promoting heat exchange between the outdoor heat exchanger and the outside air.

As is well known, in the heating operation, the indoor heat exchanger 3 functions as a heat radiator (condenser) and the outdoor heat exchanger 5 functions as a heat sink (evaporator). Further, in the cooling operation, the indoor heat exchanger 3 functions as a heat sink (evaporator) and the outdoor heat exchanger 5 functions as a heat radiator (condenser). The indoor heat exchanger 3, the indoor fan 3a and another indoor controller (described later) are assembled as an indoor unit, and the other remaining parts are assembled as an outdoor unit.

The compressor 1 is driven by a variable speed motor 6. The motor 6 is a permanent magnet type three-phase synchronous motor which is PWM (pulse width modulation) controlled by the output of an inverter 10. To the inverter 10, direct power is supplied from an alternating power source 7 of fixed frequency and fixed voltage via a rectifier 8 and a smoothing capacitor 9. The inverter 10 is provided with functions corresponding to the commutators and the brushes required for the motor 6. The inverter 10 and the motor 6 are generally referred to as a brushless motor in combination, because no mechanical commutators and brushes are provided.

Figure 10:
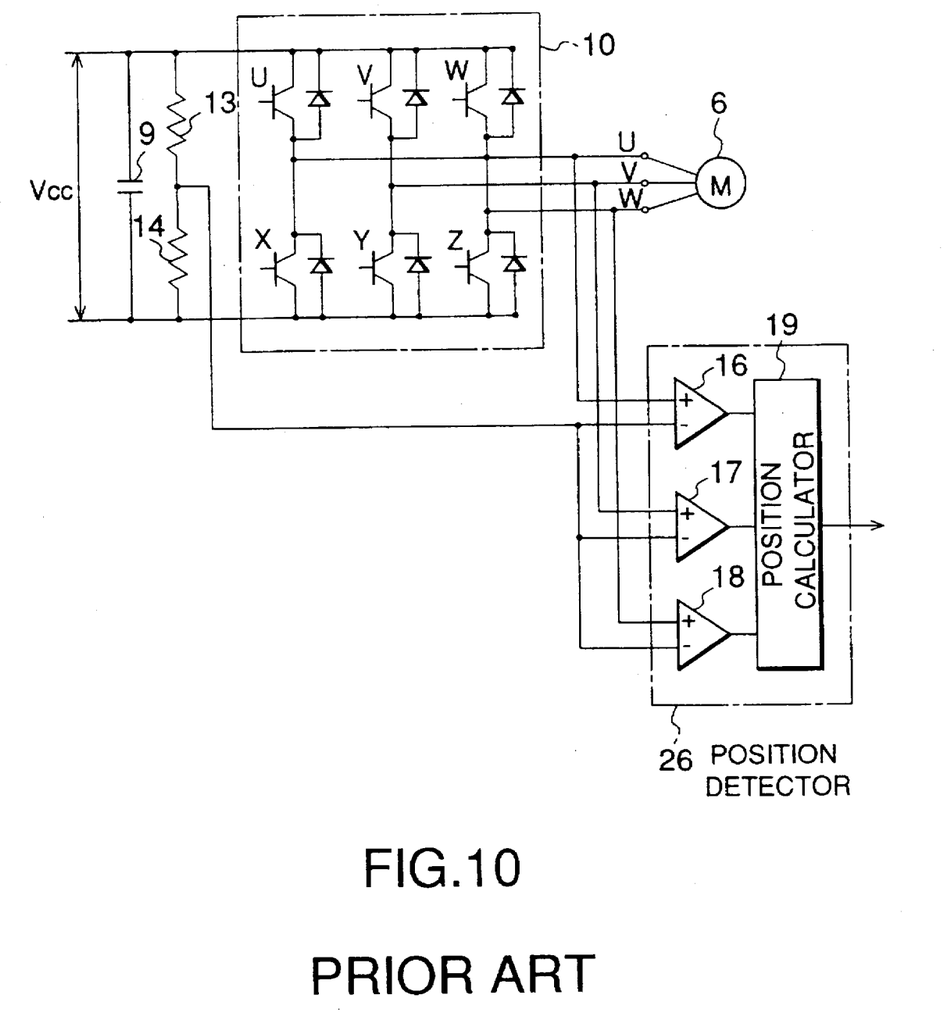
FIG. 10 is a circuit diagram showing the inverter shown in FIG. 9 together with a position detector for controlling the same inverter.

FIG. 10 is a detailed circuit configuration of the inverter 10. The inverter 10 is a three-phase bridge-type inverter, which is composed of positive polarity three-phase arms U, V and W when seen from the dc positive polarity side and negative polarity three-phase arms X, Y and Z when seen from the dc negative polarity side. The junction point between the arms U and X is connected to a U-phase terminal of the motor 6; the junction point between the arms V and Y is connected to a V-phase terminal of the motor 6; and the junction point between the arms W and Z is connected to a W-phase terminal of the motor 6, respectively.

The arms of the inverter 10 are formed of a power transistor including an antiparallel connected diode, respectively. Here, the operation of the motor 6 will be explained in further detail hereinbelow on the assumption that the motor 6 is a four-pole machine by way of example.

In the brushless motor of this sort, the two-phase windings and the three-phase windings of the motor 6 are energized by PWM-controlled pulses, and the remaining one-phase winding is deenergized. In this deenergized phase, the angular positions of the rotor are detected on the basis of an induced voltage due to rotational motion of the permanent magnet rotor, and further the energizing mode is switched cyclically in synchronism with the angular positions of the rotor. In practical terms, the induced voltage of the deenergized phase is compared with an intermediate voltage ($V_{cc}/2$) of the direct current voltage $V_{cc}$ of the inverter 10 by comparators 16, 17 and 18, respectively. In accordance with the comparison results, a position calculator 19 detects the rotor angular positions for each 60 degrees in electrical phase angle. The comparators 16 to 18 and the position calculator 19 constitute a position detector 26.

Figure 11:
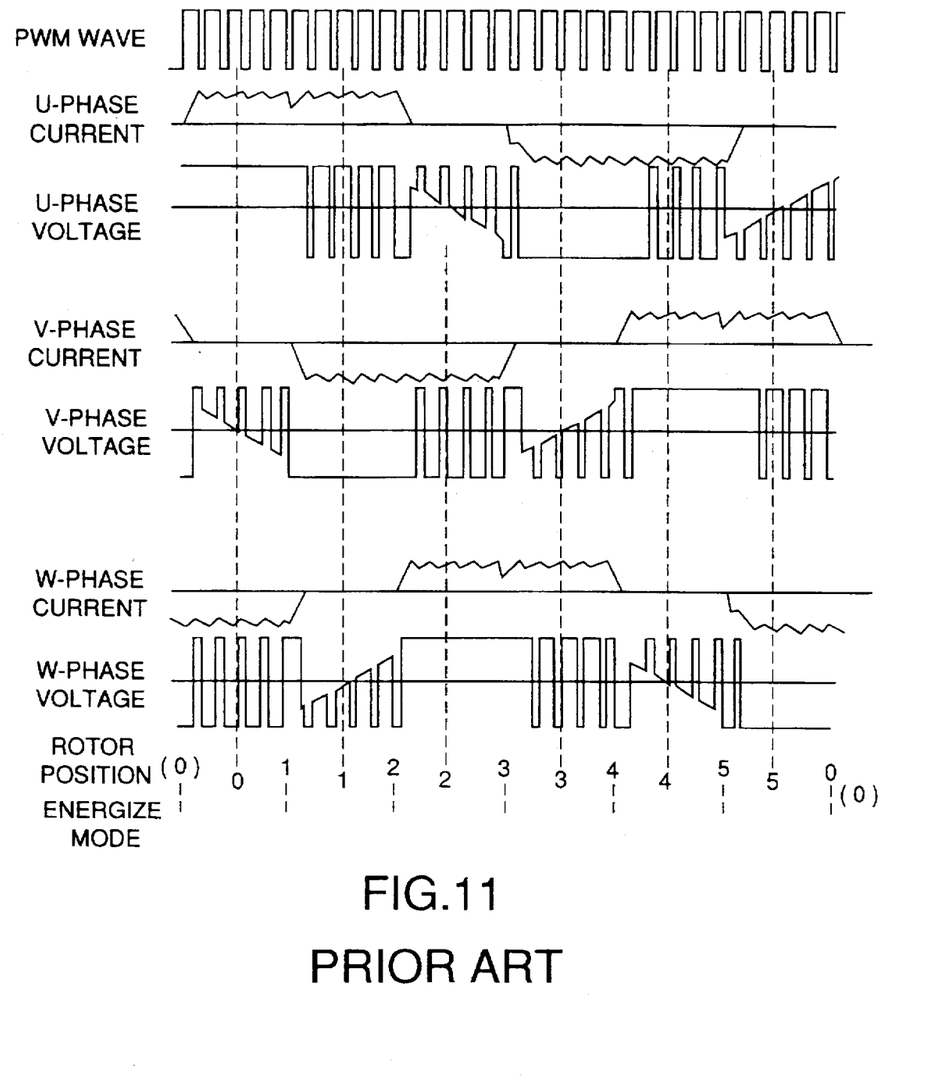
FIG. 11 is a timing chart for assistance in explaining the respective phase currents and voltages of a brushless motor for each energizing mode.

FIG. 11 shows a practical example of the energizing modes m, in which the mutual relationship among the basic PWM waveform, the current and voltage waveforms of the U, V and W phases, the rotor positions (six), and the energizing modes m are shown through 360 degrees in electrical phase angle (one cycle). As understood in FIG. 11, the energizing mode m=0 is a mode in which current is passed from the U phase to the W phase when seen from the motor side (the arms U and Z of the inverter 10 are energized) and the V phase is deenergized. In the same way, the energizing mode m=1 is a mode in which current is passed from the U phase to the V phase (the arms U and Y are energized) and the W phase is deenergized; the energizing mode m=2 is a mode in which current is passed from the W phase to the V phase (the arms W and Y are energized) and the U phase is deenergized; the energizing mode m=3 is a mode in which current is passed from the W phase to the U phase (the arms W and X are energized) and the V phase is deenergized; the energizing mode m=4 is a mode in which current is passed from the V phase to the U phase (the arms V and X are energized) and the W phase is deenergized; and the energizing mode m=5 is a mode in which current is passed from the V phase to the W phase (the arms V and Z are energized) and the U phase is deenergized, respectively. In the respective energization modes, only one of a pair of the arms through which current is passed through the motor 6 is PWM controlled and the other thereof is energized continuously. Further, the rotor angular positions can be detected by the voltage induced in the remaining phase winding through which no current flows. As shown in FIG. 11, the angular positions of the rotor are detected at such a timing as the middle of one commutation (or translocation) period (60 degrees) in the respective energization modes. Accordingly, commutation commands are outputted at each time point 30 degrees (in electrical phase angle) after one rotor angular position has been detected, respectively.

As shown in FIG. 9, the indoor heat exchanger 3 is provided with a room temperature sensor 11 for detecting room temperature $T_i$ of a room to be air-conditioned. The refrigerating cycle apparatus composed of the elements 1 to 5 is so operated that the room temperature $T_i$ becomes close to a set room temperature $T_r$.

In the above-mentioned refrigerating cycle apparatus, when the compressor is started; that is, when the motor is started, since no induced voltage for detecting the rotor angular positions is yet generated by the motor windings, it is impossible to detect the rotor angular positions. Therefore, at the motor start, the motor is started in accordance with an asynchronous forced commutation start method. In this method, the energized phases are switched forcedly without synchronism with the rotor angular positions, that is, irrespective of the rotor angular positions.

As described above, the motor is first started in accordance with the asynchronous forced commutation starting operation. Thereafter, when the motor speed reaches a value at which the induced voltage can be detected by the rotor, the asynchronous forced commutation starting operation is switched to synchronous commutation operation using the rotor angular position signals, and thereafter the switched starting operation (synchronous commutation operation) is kept as it is. Further, upon the end of the starting operation, the output of the inverter 10 is so controlled that the motor is driven in accordance with the command frequency outputted by the indoor unit.

In the above-mentioned refrigerating cycle apparatus, conventionally, the induction motor has been generally used as the motor for driving the compressor. In the case of the induction motor, however, the rotor is rotated by a slip generated according to the magnitude of load in relation to the rotating field formed by the stator winding. On the other hand, when the refrigerating cycle apparatus is started, in order to increase the compressor speed to a target speed, it is necessary to start the motor in accordance with a sequence under due consideration of an increasing speed of the motor input frequency (i.e., the inverter output frequency) and the hold time to the predetermined starting frequency, from the standpoints of the stability and the reliability of the refrigerating cycle apparatus. In the case of the induction motor, since a difference in the compressor speed due to a difference in magnitude of load at the motor start can be absorbed as a difference in slip of the motor, it is necessary to prepare only one energizing sequence for the starting motor, that is, only one frequency pattern. That is, in the case where the induction motor is used for driving the compressor, since the difference in load at the motor start can be absorbed by the difference in slip of the induction motor, a target speed in the motor starting operation can be given by the same pattern irrespective of the load.

In the case where the brushless motor is used for driving the compressor, since the actual speed of the compressor at the starting operation deviates largely to a high speed side (under a light load) or a low speed side (under a heavy load) according to the target speed and the load at the start operation, there exists the case where a deceleration control is required at the start operation or a protective circuit is activated due to excessive current flow due to large acceleration so that the circuit is cut off.

In the air conditioning system of this sort, the starting load of the compressor differs largely according to the status of the refrigerating cycle apparatus. For instance, the compressor load fluctuates largely according to the refrigerant pressure on the inlet side or outlet side of the compressor, or the liquid back (the refrigerant is mixed with lubricant immediately after the starting operation). Therefore, in the case where the brushless motor having such advantages as the low loss and low heat generation is used, when the starting operation enters the synchronous commutation operation at an excessively early timing, since the difference between the actual speed and the target speed becomes large due to load fluctuations, there exist such problems in that an excessive current flow due to quick acceleration, or the step-out or abnormal stop of the motor occurs due to an excessive load or non-uniform speed. In contrast with this, when the timing at which the synchronous commutation starts is too late, there exists another problem in that it takes a long time to start the operation of the system. Further, since it is not preferable to drive the compressor in a low speed range (in which the lubricating conditions are poor in the rotating parts of the compressor) for a long time, when the motor start operation does not end even after a predetermined time has elapsed, there exists a problem in that the system must be stopped because of an abnormal start or a start failure.

SUMMARY OF THE INVENTION

Accordingly, the object of the present invention is to provide a method of controlling the start of a compressor driven by a brushless motor in a refrigerating cycle, which can stably start the compressor automatically at as short a rise time as possible and without causing abnormal compressor stop as much as possible.

To achieve the above-mentioned object, the present invention provides a method of controlling the start of a compressor driven by a brushless motor in a refrigerating cycle, comprising the steps of: starting the brushless motor at halt in accordance with asynchronous forced commutation operation without use of any rotor position detection signals; and when the rotor position signals are detected predetermined times or more due to synchronous commutations, shifting the asynchronous forced commutation operation to synchronous commutation starting operation with the use of the rotor position detection signals.

Further, the present invention provides a method of controlling the start of a compressor driven by a brushless motor in a refrigerating cycle, comprising the steps of: starting the brushless motor at halt in accordance with asynchronous forced commutation operation without use of rotor position detection signals; increasing voltage applied to the motor at essentially a constant rate with respect to time within a range below a predetermined value; and during the forced commutation operation, when the rotor position detection signals are detected, shifting the asynchronous forced commutation operation to synchronous commutation starting operation using the rotor position detection signals.

In the method of the present invention, in starting the compressor driven by the brushless motor, the brushless motor being at halt is first started in accordance with asynchronous forced commutation operation without use of any rotor angular position detection signals; and when the rotor angular position detection for enabling the synchronous commutation can be attained predetermined times or more or when the rotor angular position detection is enabled by increasing voltage applied to the motor at essentially a constant rise rate (less than a predetermined value) with respect to time during the forced commutation operation, the asynchronous forced commutation operation is shifted to synchronous commutation starting operation using the rotor position detection signals. Consequently, it is possible to stably start the compressor automatically at as short a rise time as possible and without causing abnormal compressor stop as much as possible.

DETAILED DESCRIPTION OF THE PREFERRED EMBODIMENTS

Figure 1:
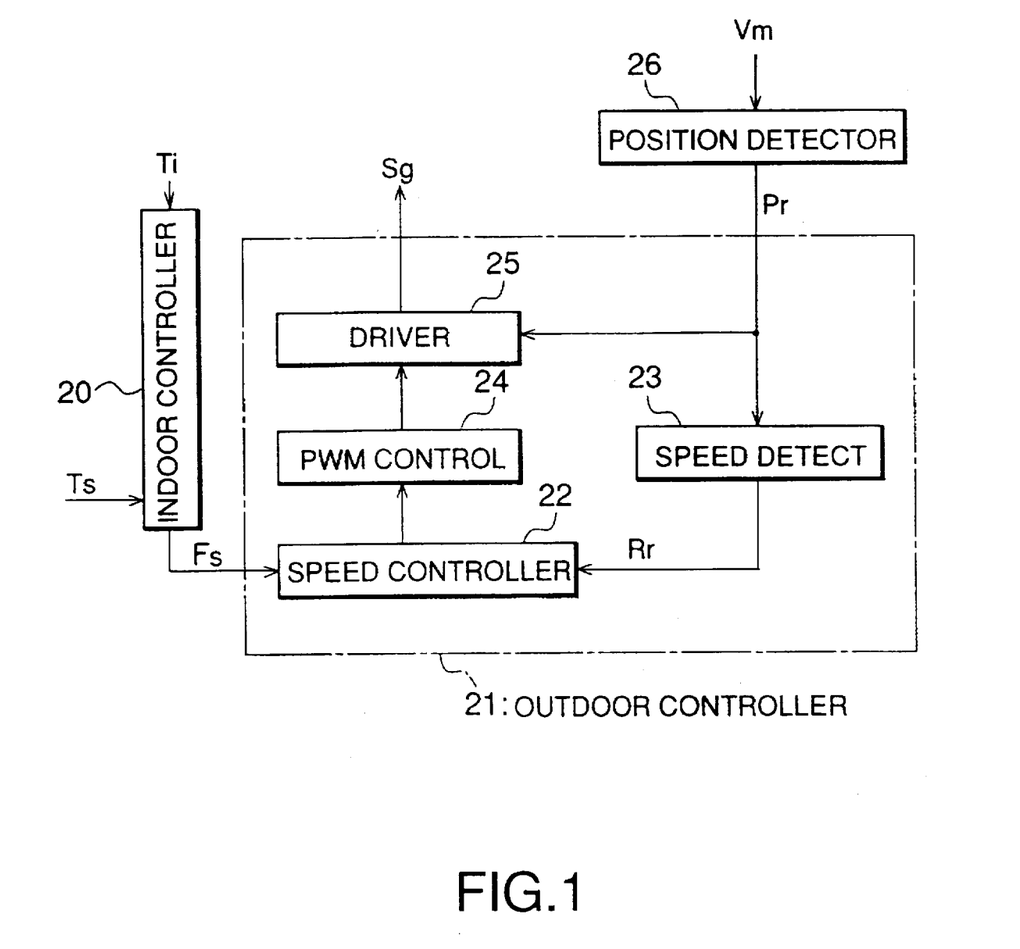
FIG. 1 is a block diagram showing an example of an apparatus for implementing the control method according to the present invention.

FIG. 1 is an example of the apparatus for implementing the control method according to the present invention.

In FIG. 1, an indoor controller 20 compares a room temperature $T_i$ detected by a room temperature sensor 11 with a set room temperature $T_s$, and transmits a frequency command $F_s$ for bringing the room temperature to the set temperature to a speed controller 22 included in an outdoor controller 21 together with other data required for the air conditioning control. The outdoor controller 21 includes a speed detecting section 23, a PWM control section 24, a driver 25, etc. in addition to the speed controller 22. A position detection signal is inputted from a position detector 26 to the speed detecting section 23 and the driver 25. A general purpose controller such as INTEL Model: 80C196MC, for instance can be used as the indoor controller 20.

A voltage $V_m$ of a motor 6 is inputted to the position detector 26. As already explained, the position detector 26 detects the rotor angular positions of the motor 6 on the basis of the induced voltage of the deenergized phase, and outputs the detected position signals $P_r$. The detected position signals $P_r$ are supplied to the speed detecting section 23 and the driver 25. The speed detecting section 23 calculates an actual rotative speed $R_r$ (rps) of the motor 6 on the basis of the number of position signals $P_r$ per unit time or a time interval between two or more position signals $P_r$, and outputs the calculated speed to the speed controller 22. In this embodiment, since the number of the position signals $P_r$ is 12 (=6×number of poles/2), if a time interval between the two position signals $P_r$ is $T_T$ (ms), it is possible to obtain the number of revolutions of the motor (rps) per second as the motor speed $R_r=10^3/(12 \times T_T)$. After the starting operation ends, the speed controller 22 outputs a control signal so the operating frequency $f=2 \times R_r$ corresponding to the motor speed $R_r$ can match the command frequency $F_s$ commanded by the indoor controller 20. On the basis of the control signal, a manipulated variable signal $S_g$ can be formed through the PWM control section 22 and the driver 25 to control the output of the inverter 10.

The method of controlling start of the motor according to the present invention will be first summarized hereinbelow, prior to a detailed description thereof with reference to flow charts shown in FIGS. 2 to 4.

SUMMARY OF START CONTROL

The start control method according to the present invention is composed of essentially four operations as follows: (1) asynchronous forced commutation operation, (2) synchronous commutation starting operation, (3) steady-state synchronous commutation operation, and (4) restarting operation. The respective operations are as follows:

(1) Asynchronous forced commutation operation (blocks 30 to 51)

In this operation, the current mode is switched to the succeeding mode after a predetermined mode time has elapsed, irrespective of the presence or absence of the position detection signals. These blocks are further classified into [voltage control], [mode switching control] and [shift decision to another operation].

[Voltage control]

The duty factor D of the inverter output increases with the lapse of time as (D=5+0.5 n), where n is a passage of time (second) after start and the upper limit of D is 13%.

[Mode switching control]

The mode switching is executed forcedly for each $T_T=65$ ms, until the positions are detected two times continuously.

When the positions are detected twice continuously, the mode switching is executed within $T_T$ sec (a time between two positions before the current position and the preceding position). In case the position detection fails midway, the mode switching is executed on the basis of the finally detected time $T_T$ (a time between two position detections).

[Shift decision to another operation]

When the positions are detected 8 times continuously and when 4 seconds have elapsed after start under condition that the compressor speed is 10 rps or higher, the operation is shifted to the synchronous commutation starting operation (block 52).

After 40 seconds have elapsed after start, the operation is interrupted once and then shifted to the restarting trial (block 58).

(2) Synchronous commutation starting operation (blocks 52 to 87)

This operation discriminates whether the position detection based upon the synchronous commutation is stable or not; that is, whether there exists no problem when the synchronous commutation operation is being implemented, in the process when the forced commutation operation is shifted to the final synchronous commutation operation.

In case the position detection is abnormal in the synchronous commutation operation, the operation is stopped immediately and then once returned to the forced commutation operation (1). Here, the conditions under which the abnormal position detection is discriminated in this forced commutation operation are more severe than those in the synchronous commutation operation. These blocks can be classified into [voltage control], [mode switching control] and [shift decision to another operation].

[Voltage control]

The same as the voltage control in the forced commutation operation.

[Mode switching control]

The commutation is implemented a time $T_T/2$ after the position signal detection, where $T_T$ denotes a time between two positions before the current position and the preceding position.

[Shift decision to another operation]

When the positions are detected 255 times continuously (about 21 revolutions) and further the compressor speed is more than 10 rps, the first step ends. Thereafter, when the positions are detected about 255 times again continuously and further the compressor speed is more than 6 rps, the operation is shifted to the synchronous commutation operation (block 88).

After 40 seconds have elapsed after start, the operation is interrupted once and then shifted to the restarting trial (block 58).

In the operation, when positions are not detected for more than a time interval $T_T$ between two positions before the current position and the preceding position, the operation returns to the asynchronous forced commutation operation (block 34) at the commutation time $T_T$.

(3) Synchronous commutation operation (speed control operation, blocks 88 to 118)

This operation is implemented after having been started and when shifted to a target speed. Before this operation, the compressor speed is not stable. In this operation, however, since the duty factor D is controlled under speed feedback control, it is possible to control the compressor speed accurately.

In this operation, the operation is divided into "a first half" and "a second half". In the first half operation, the compressor speed is limited below 30 rps for 50 seconds after start in order to prevent the compressor from being driven at a high speed. In the second half operation, the compressor speed is controlled according to the load of the refrigerating cycle apparatus. Both the first and second half operations can be classified into [voltage control], [mode switching control] and [shift decision to another operation].

(First half synchronous commutation operation) (blocks 88 to 109)

This operation is effected within 50 seconds after start.

[Voltage control]

The duty factor D is increased and decreased so that the actual speed $R_r$ reaches the target speed $R_s=30$ rps. In practice, when the actual speed $R_r$ is lower than the target speed $R_s$, the duty factor D is increased by a minute value $\Delta D$, and when the actual speed $R_r$ is higher than the target speed $R_s$ (although there exists a possibility when the load is extremely light, this case hardly exists in practice), the duty factor D is decreased by a minute value $\Delta D$.

Here, in order to prevent the compressor speed change rate and the change rate speed (acceleration and deceleration) from being increased excessively, that is, to prevent the abnormal conditions of the compressor sliding portions or the speed overshoot, the duty factor D is changed. In order to suppress the speed change per unit time ($T_S$) below $\Delta R$ (about=1 rps), the target speed is increased by $\Delta R$ for one second relative to the actual speed $R_r$. In the same way, it is also possible to limit the change rate of the duty factor D with respect to time below a predetermined value.

[Mode switching control]

The commutation is implemented a time $T_T/2$ after the position signal detection, where $T_T$ denotes a time between two positions before the current position and the preceding position. Although not shown in the flow chart, however, this time may be shortened according to the actual speed under the lead angle control, for instance.

[Shift decision to another operation]

In the operation, when positions are not detected for more than a time interval $2 \times T_T$ after the preceding position signal detection (where $T_T$ denotes a time between two positions before the current position and the preceding position), the operation is discriminated as being abnormal, and returned to the restarting trial (block 58).

Here, the reason why the precision of non-position signal detection is reduced as compared with the case of starting is that the position detection speed is lowered due to lower compressor speed control and thereby the position detection is delayed.

(Second half synchronous commutation operation) (blocks 110 to 117)

This operation is effected within 50 seconds after start.

[Voltage control]

The duty factor D is increased and decreased on the basis of a difference between the command frequency $R_s$ according to the air-conditioned load and the actual speed $R_r$ based upon the position detection.

The practical duty factor D is controlled in the same way as with the case of the first half synchronous commutation operation.

[Mode switching control]

The same as with the case of the first half synchronous commutation operation.

[Shift decision to another operation]

The same as with the case of the first half synchronous commutation operation.

(4) Restarting processing (blocks 58 to 64)

When the abnormal position detection or others are discriminated, the compressor and the motor are interrupted. In the case of interruption within 50 second after start, the asynchronous forced commutation operation starts after 10 seconds have elapsed after interruption. However, when 50 seconds have elapsed after start, the asynchronous forced commutation operation starts again after 2 minutes and 30 seconds.

However, when the abnormality is detected three times or more in a single operation, the operation is stopped and an abnormality is displayed.

Example of start control

Figure 2:
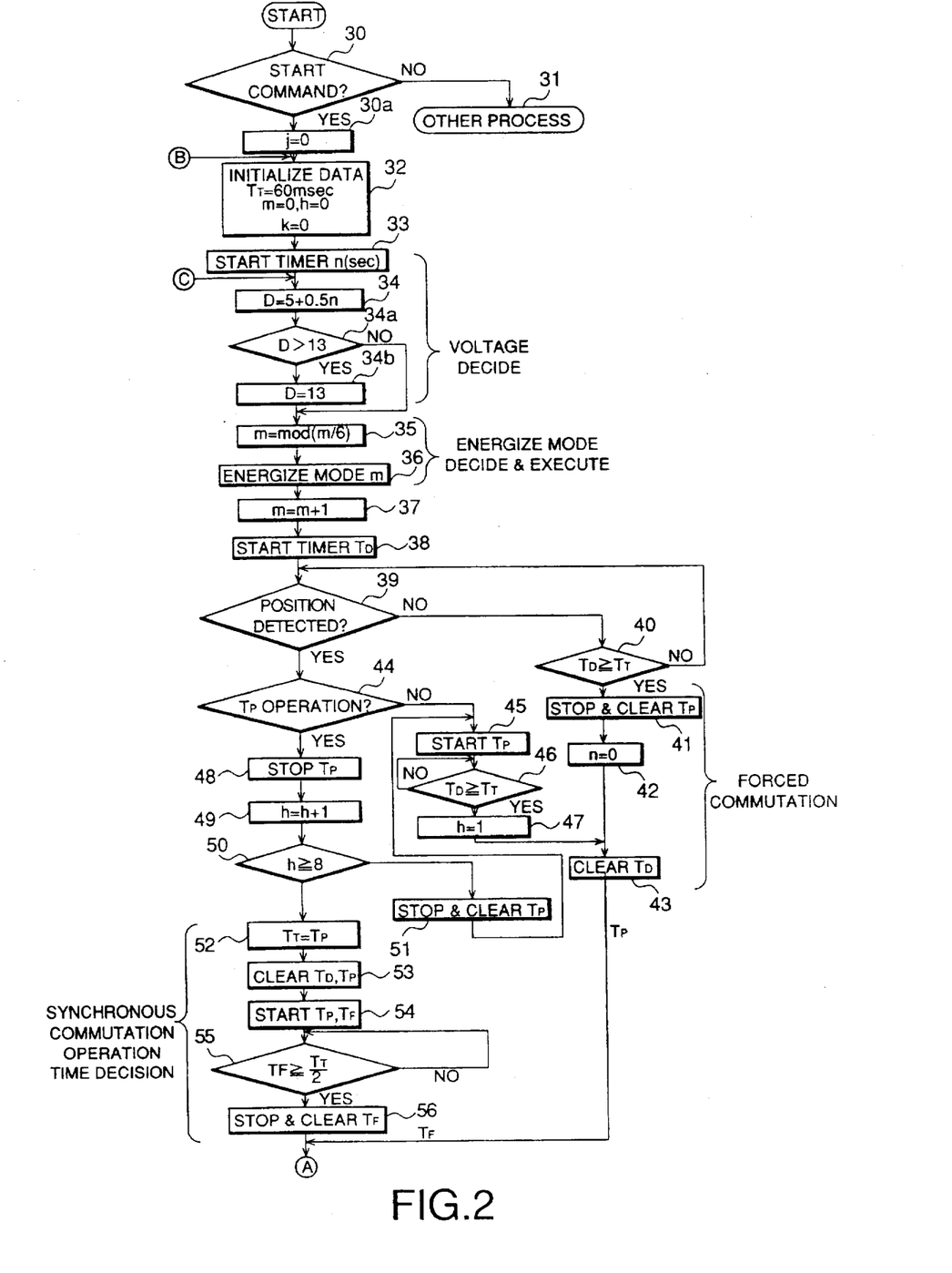
FIG. 2 is a flowchart showing a first part of a processing routine of a first embodiment of the present invention.
Figure 3:
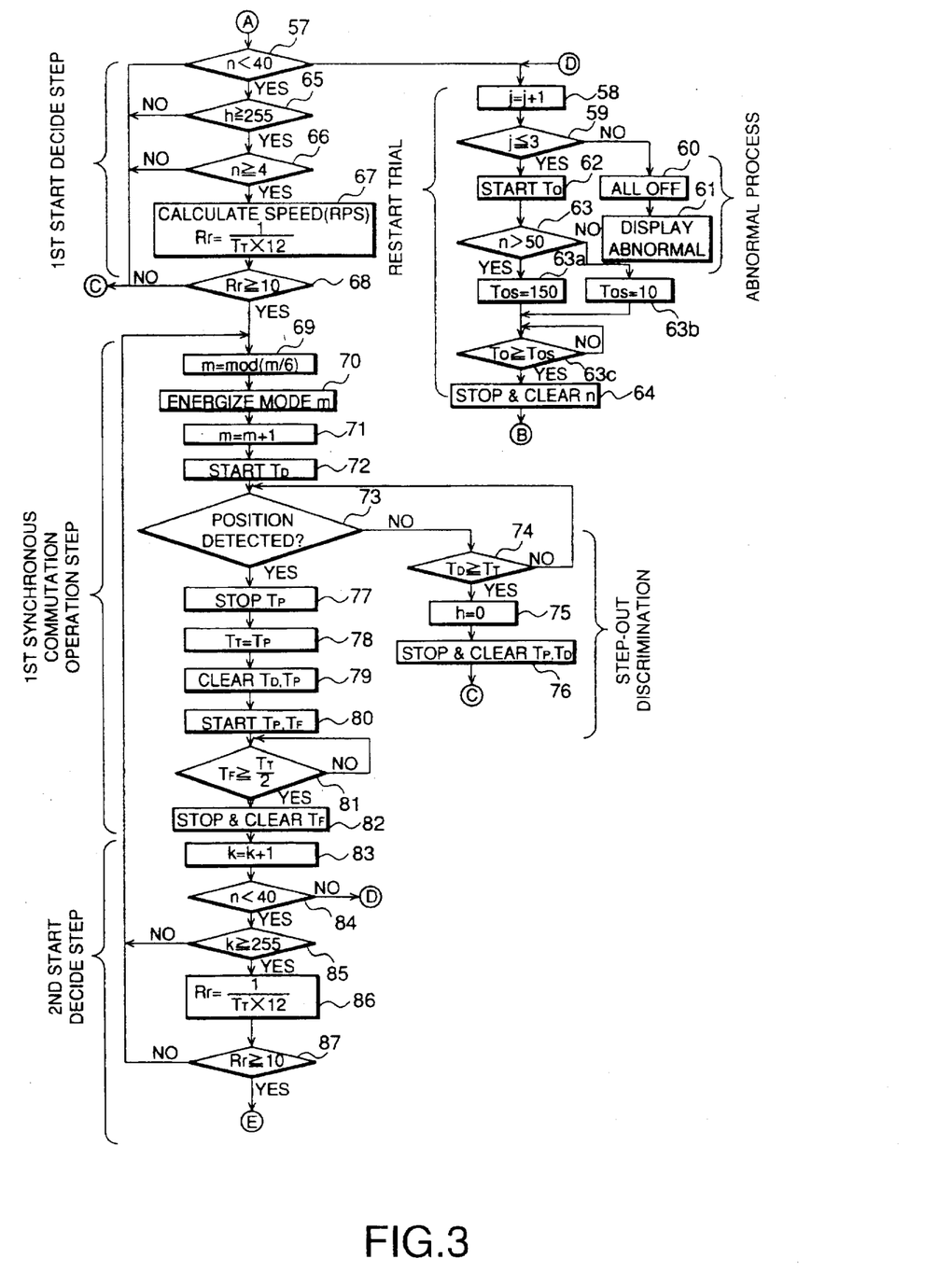
FIG. 3 is a flowchart showing a second part of a processing routine of the first embodiment of the present invention.
Figure 4:
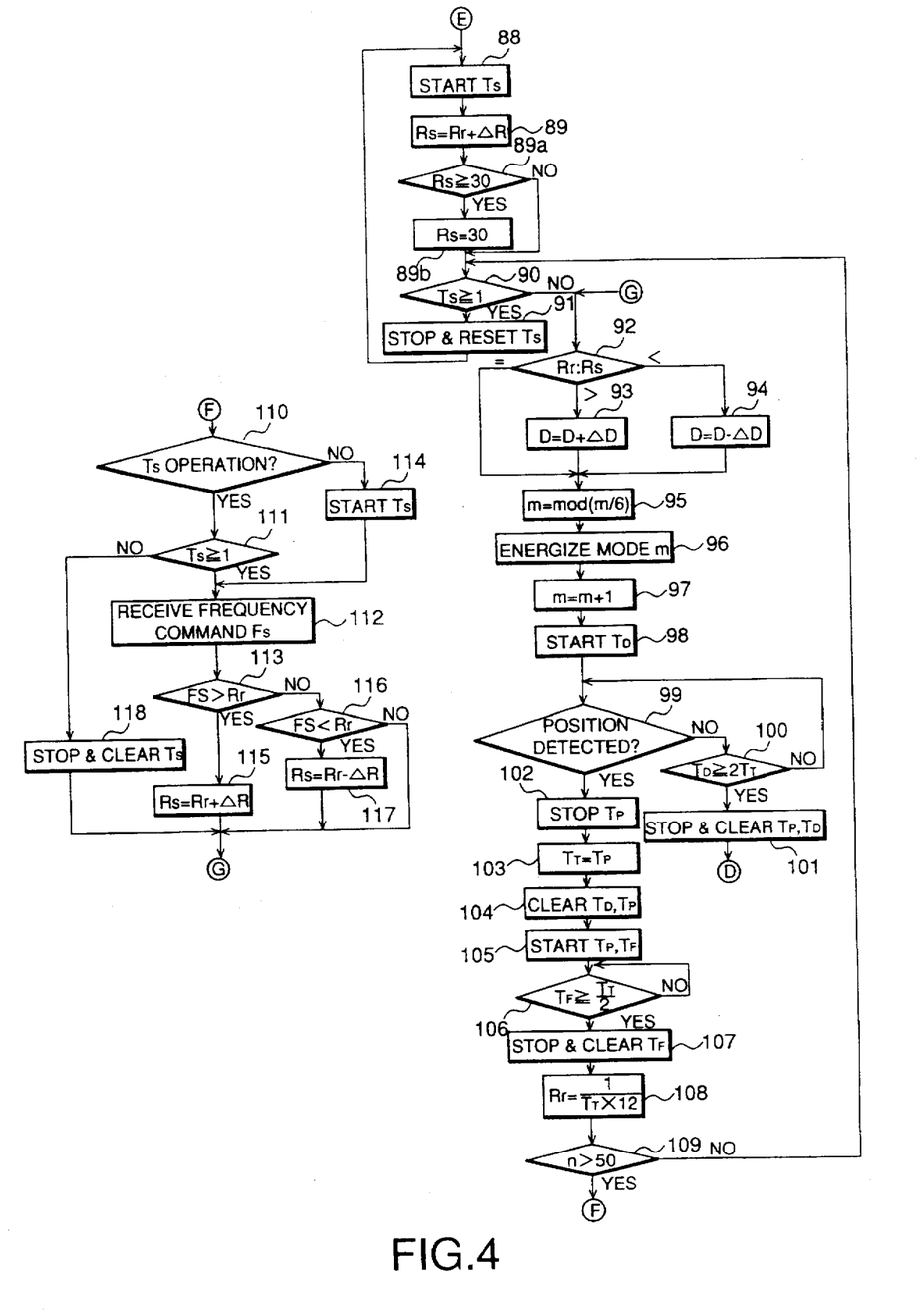
FIG. 4 is a flowchart showing a third part of the processing routine of the first embodiment of the present invention.
Figure 5:
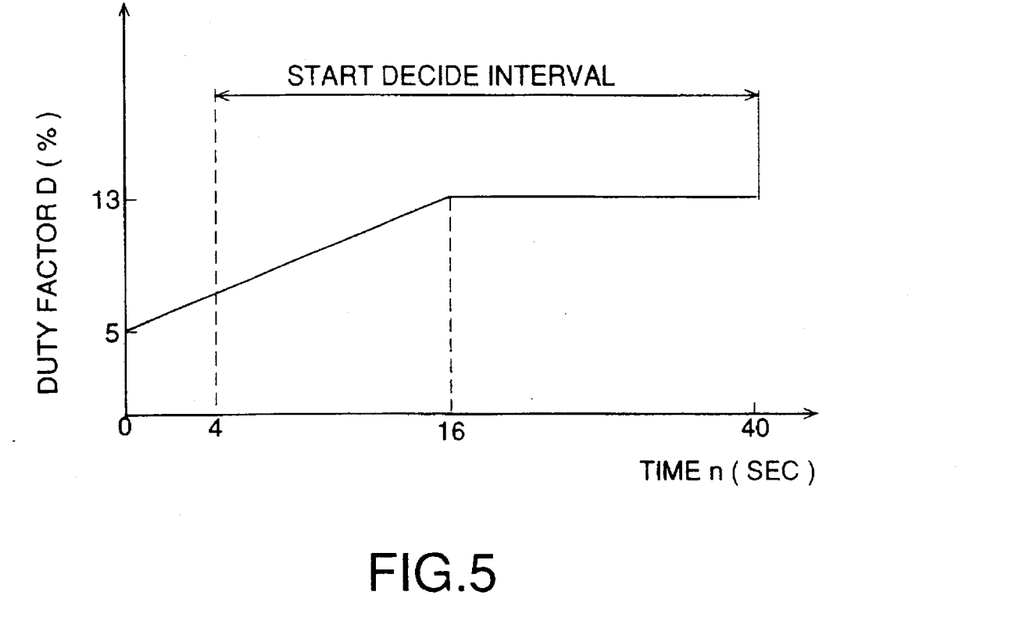
FIG. 5 is a graphical representation showing a voltage pattern (duty factor) applied at start operation.
Figure 6:
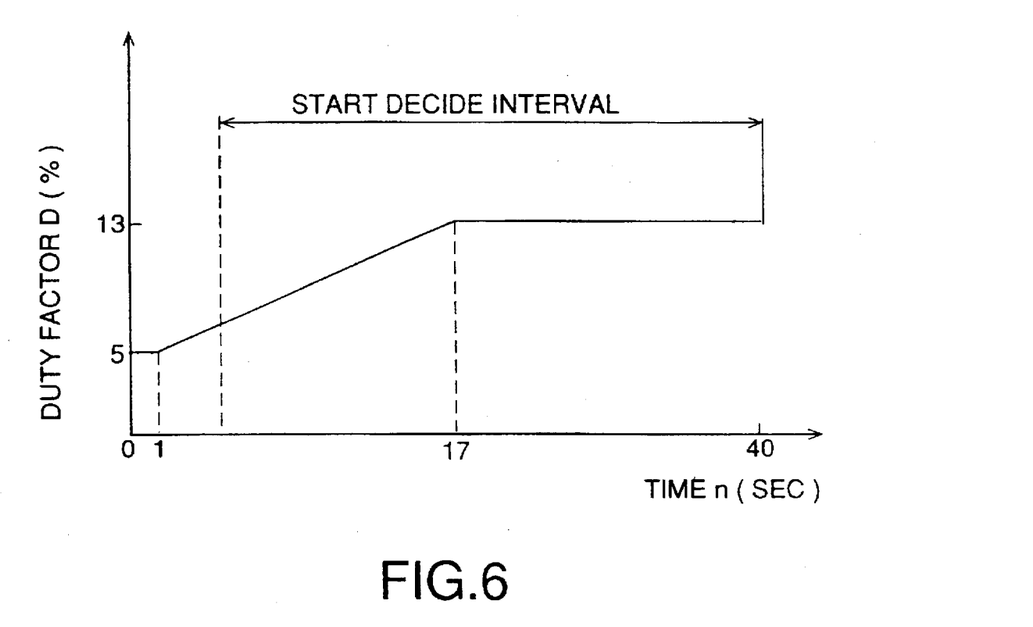
FIG. 6 is a graphical representation showing the other voltage pattern (duty factor) applied at start operation.

FIGS. 2 to 4 are flow charts showing the Start controlling routine executed by the speed controller 22. When this routine starts, the speed controller 22 (referred to as simply control, hereinafter) checks the presence or absence of the starting command (in block 30). If NO, control proceeds to another routine for executing processing other than the starting processing (in block 31). If YES in block 30; that is, if the starting command is present, control initially sets the forced commutation time, that is, the same mode time $T_T$ to $T_T=60$ ms (this corresponds to the motor speed=$10^3/(120 \times 60)=1.39$ (rps) and the command frequency=2.78 (Hz)), initializes the respective variables m, h, j, and k to "0" (in block 32), and proceeds to voltage deciding blocks 33 and 34. The variable m is a variable representative of the energization mode, the variables h and k are variables representative of the number of counted synchronous commutations in the starting operation, respectively, and the variable j is a variable representative of the number of counted restarting operation trials. Control first starts to integrate the time n (s) after the starting (in block 33), and calculates the duty factor D (%) on the basis of the integrated time n and in accordance with the calculation formula: D=5+0.5 n (in block 34). As shown in FIG. 5, on this calculation formula, D=5 at n=0 and thereafter the voltage value is increased at a proportion of 0.5 (%/s) with the lapse of time. In this control method, the compressor is started by applying a relatively low voltage to the motor 6, in order that an excessive torque will not be generated by the motor 6 and thereby a shock will not be applied to the compressor 1. After start, the voltage is increased gradually so that the motor does not stay in a low frequency range (low speed range) for a long time; that is, so that the speeds of the motor 6 and the compressor 1 can both rise quickly. The start deciding time is detected for 40 sec at its maximum on the basis of the variable n in the synchronous commutation operation. In this case, however, the duty factor D is limited below an upper limit of 13% (n=(13−5)/0.5=16 sec), as shown in FIG. 5, in order to prevent the motor voltage from being increased excessively (in blocks 34a and 34b). With respect to the voltage rise pattern, without being limited to only that shown in FIG. 5, it is possible to use another appropriate pattern as shown in FIG. 6. In FIG. 6, the minimum voltage retaining period (D=5%) is determined for one second immediately after the starting command, and thereafter the voltage is increased up to the upper limit (D=13%) at the same rise rate (0.5%/s) shown in FIG. 5.

The succeeding processing is to decide and execute the energization mode. In this processing, the commutation of the inverter 10 is controlled in accordance with the variable m (referred to as energization mode, hereinafter) representative of energization mode. This processing is composed of the processing (in block 35) by which the calculation result of an operation expression: m=mod (m/6) is obtained as a new variable value m and the processing (in block 36) by which the motor is energized in accordance with the energization mode. Here, mod (m/6) indicates a remainder obtained when the energization mode value is divided by a value 6. The practical example of the energization modes m has been already explained with reference to FIG. 11.

After the energization mode m has been determined and further the forced commutation control has been executed in accordance with the decided mode, control increments m as m=m+1 to prepare the switching of the energization mode (in block 37). Thereafter, control starts counting the time $T_D$ (ms) elapsed after the energization mode has been switched (in block 38). Further, control checks whether the rotor angular position has been detected (in block 39).

In block 39, if NO; that is, if no rotor position is detected, control checks the time $T_D$ (the counting has been already started in block 38); that is, checks whether $T_D \geq T_T$ or not (in block 40). If NO; that is, $T_D < T_T$, control returns to block 39. Here, if the position detection is absent and further $T_D < T_T$, control stands by at this block 39. If YES; that is, if $T_D \geq T_T$, control stops the time $T_P$ (the timer time for counting a time from the current rotor position detection to the succeeding rotor position detection) and clears the already counted time, in order to implement the asynchronous forced commutation starting in the succeeding energization mode (in block 41). Further, control clears the variable h representative of the number of continuously counted position detections (in block 42) and the time $T_D$ (in block 43), proceeding to block 57.

In block 39, if YES; that is, if the position detection is present, control checks whether the time $T_P$ is kept counted or not (in block 44). If NO; that is, if the time $T_P$ is not being counted because the positions are not detected in the preceding energization mode, control starts counting a new time $T_P$ (in block 45). In the same way as in block 40, control checks whether $T_D \geq T_T$. If NO; that is, if $T_D < T_T$, control stands by the succeeding commutation chance (in block 46). Here, if YES; that is, if $T_D \geq T_T$, since the initial position detection is made, control sets h to h=1 (in block 47) and proceeds to block 43.

In block 44, if YES; that is, if the time $T_P$ is being counted, control stops counting the time $T_P$ (in block 48), and increments h as h=h+1 (in block 49). Further, control checks whether h≧8 (the variable h representative of the number of continuously counted position detections); that is, control checks whether the positions are detected continuously 8 times or more (in block 50).

In block 50, if NO; that is, if h<8, control stops the time $T_P$ and clears the counter (in block 51), and proceeds to block 45. In block 50, if YES; that is, if h≧8, control sets $T_T$ to $T_T=T_P$ (in block 52), clears $T_D$ and $T_P$ (in block 53), starts counting $T_P$ and $T_F$ (in block 54), and checks whether $T_F \geq T_T/2$ (in block 55). In block 55, if NO; that is, if $T_F < T_T/2$, control stands by (in block 55). If $T_F \geq T_T/2$, control stops $T_T$, clears the counter (in block 56), and proceeds to block 57. That is, on the basis of the processing of $T_T=T_P$ (in block 52), in the case of the presence of the position detection, the maximum time is limited below $T_P$ in the succeeding energization modes. Further, the blocks 50 to 56 indicate the processing for deciding the commutation time for the synchronous operation in which the commutation is executed on the basis of the position detection signals.

In block 57, control checks whether n<40 (sec). If NO; that is, if n≧40, the restarting is tried three times on the basis of the variable j (in blocks 32 to 56). Here, the time n=40 sec counted after the starting command is a time determined empirically. This time is determined as the maximum standard time required to decide whether a series of the operation have been executed successfully or not. First, control increments the variable j representative of the number of counted starting failures as j=j+1 (in block 58). Control checks whether j≦3 (in block 59). If NO; that is, if j>4, since this indicates that the starting operation fails four times or more in a single operation, control determines that an abnormality such as impossible starting occurs due to compressor lock, no phase voltage, overload, etc., turns off the entire system (in block 60), and displays an abnormality (in block 61). If YES; that is, if j≦3 in block 58, control starts counting the time $T_O$ (in block 62), and checks whether n>50 sec (n: the time after starting) (in block 63). On the basis of this discrimination, control discriminates whether the abnormality occurs during the starting operation (n≦50) or during the operation (in blocks 100 and 101). In the case of the abnormal stop during the starting operation, since the pressure difference in the refrigerating cycle is excessively small, the compressor interruption time $T_{OS}$ is shortened as 10 sec. In the case of the abnormal stop during the operation, control sets a long time 150 sec (=2 minutes and 30 seconds) as the time during which the pressure difference is reduced (in blocks 63a and 63b). Further, control stands by until the time $T_O$ exceeds $T_{OS}$ (in block 63c). In block 63c, if $T_O \geq T_{OS}$, control stops the count time n and clears the counter (in block 64), returning to the block 32 to try the restarting again.

In block 57, if YES; that is, if n<40 sec, control precesses a first start deciding step at the constant applied voltage (in blocks 65 to 68). First, control checks whether h≧255 (in block 65). The number of commutations "255" is determined as a value required to decide the stable operation, in order to avoid the liquid back (occurring immediately after the compressor has been started) or rotational speed fluctuations (due to load fluctuations), or motor step-out at acceleration or a stop due to abnormality, etc. In block 65, if NO; that is, if h<255, control returns to block 34. In block 65, if YES; that is, if h≧255, control further checks whether n≧4 (in block 66). If NO; that is, if n<4, control returns to block 34. Here, since the status n<4 occurs when the compressor speed increases abruptly under a light load, control returns to the block 34 for restarting, so that it is possible to gain time until a stable compressor revolution can be obtained. In block 66, if YES; that is, if n≧4, control calculates the speed $R_r$ rps (the number of revolutions per second) as $R_r=1/(12 \times T_T)$ (in block 67), and further checks whether $R_r \geq 10$ (in block 68). Here, under the condition that the number of poles P of the motor 6 is P=4, the operational expression is determined on the basis of $R_r=2 \times$frequency/$P=2/($frequency$\times P)=2/(6 \times T_T \times 4)$. Further, in block 68, if $R_r<10$, control determines that the load is abnormally high, for instance as when the compressor is almost scuffed or the viscosity of lubricant is excessively high, etc., and returns to block 34 to gain time until a stable compressor revolution can be obtained. In block 68, if YES; that is, if $R_r \geq 10$, control decides that the compressor is started stably, and enters a first synchronous commutation starting operation routine or step (blocks 69 to 83).

In this routine, in the same way as in block 35, control stores the calculation result of the operational expression: m=mod (m/6) as the variable m corresponding to a new energizing mode (in block 69). On the basis of the variable m thus obtained, control selects a pair of transistors from the transistors U to Z (see FIG. 1) for energization (in block 70). After this block processing, control increments the variable m as m=m+1 (in block 71) and starts counting the time $T_D$ (ms) after the mode switching or from the commutation time point (in block 72). Thereafter, control checks whether the rotor position has been detected (in block 73).

In block 73, if NO; that is, if the position detection is absent, control executes the processing for discriminating step-out of the motor (in blocks 74 to 76). In this processing, first control checks whether $T_D \geq T_T$ (in block 74). If NO; that is, if $T_D < T_T$, control returns to block 73, and stands by in this block as far as the position detection is absent and $T_D < T_T$. In block 74, if YES; that is, if $T_D \geq T_T$, control determines a step-out and sets h to h=0 (in block 75). Further, control stops $T_P$ and $T_D$ and clears the counting (in block 74), returning to the block 34 for restarting.

In block 73, if YES; that is, if the position detection is present, control stops counting the time $T_P$ (in block 77), sets a new energization time $T_T$ (in block 78), clears $T_D$ and $T_P$ (in block 79), and starts counting the times $T_P$ and $T_D$ (in block 80). Further, control checks whether $T_F \geq T_T/2$ (in block 81). If NO; that is, $T_F < T_T/2$, control stands by here (in block 81). If $T_F \geq T_T/2$, control stops counting $T_F$, and clears the counting (in block 82). Thereafter, control increments k as k=k+1 (in block 83), and proceeds to the second step (blocks 84 to 87) for start decision before returning to the succeeding energization mode processing (block 69).

In this step, control first checks whether n<40 sec (in block 84). If NO; that is, if n≧40, control determines that the normal starting is not effected, and returns to the block 58 to try restarting again beginning form the first. If YES; that is, if n<40, control checks whether the value k representative of the number of continuous position detections is k≧255 (in block 85). If NO; that is, if k<255, control returns to block 69 to execute the first synchronous commutation starting operation step. In block 85, if YES; that is, if k≧255, control calculates $R_r=1/(T_T \times 12)$ (in block 86), and further checks whether $R_r \geq 10$ (in block 87). Here, if NO; that is, if $R_r<10$, control returns to block 69 to execute the first synchronous commutation starting operation step. In block 87, if YES; that is, if $R_r \geq 6$, control executes the processing after block 88, that is, executes the routine for shifting the starting operation to the steady state operation.

The first block 88 for shifting the starting operation to the steady state operation is a starting processing of a timer time $T_S$ for changing a target speed, that is, for setting unit time (one second). After this processing, control calculates $R_S=R_r+\Delta R$ on the basis of the target speed $R_S$ (in block 89). After this processing, the operation is controlled so that this target speed $R_S$ does not exceed 30 (rps) (in blocks 89a and 89b). Thereafter, control checks whether $T_S \geq 1$ (s) (in block 90). In block 89, ΔR indicates a numerical value corresponding to a change rate per unit time (1 sec) of the target speed $R_S$ (equivalent to acceleration). In other words, this value is so determined that the acceleration will not be increased extremely large when a difference between the target speed $R_S$ and the actual speed $R_r$ is relatively large. In block 90, if YES; that is, if $T_S \geq 1$, control returns to block 88. If NO; that is, if $T_S<1$, control further checks whether $R_r<R_S$ or $R_r>R_S$ (in block 92). If $R_r>R_S$, control calculates D=D+ΔD to gradually increase the motor voltage (in block 93). If $R_r<R_S$, control calculates D=D−ΔD for voltage correction (in block 94), and calculates m=mod (m/6) in the same way as already explained (in block 95). In block 92, if $R_r=R_S$, control directly proceeds to block 95 without changing D. As described above, it is possible to limit the compressor speed change rate at ΔR/set as its maximum by the processing of blocks 88 to 95. Control energizes the motor in the succeeding energization mode (in block 96), increments m as m=m+1 (in block 97), starts counting the time $T_D$ (in block 98), and further checks whether the rotor position can be detected (in block 99).

In block 99, if NO; that is, if the position detection is absent, control first checks whether $T_D \geq 2T_T$ (in block 100). Here, if NO; that is, if $T_D \geq 2T_T$, control returns to block 99, and stands by in this block as far as the position detection is absent and $T_D \geq 2T_T$. In block 100, if YES; that is, if $T_D \geq 2T_T$, control stops $T_P$ and $T_D$, clears the counting (in block 101), and jumps to block 58 to try restarting. In this operation, the time $T_D$ between the energization mode switching and the position detection can be determined up to a value twice longer than the time $T_T$ between the preceding position detection and the current position detection.

In block 99, if YES; that is, if the position detection is present, control stops counting the time $T_P$ (in block 102), sets $T_T$ to $T_T=T_P$ (in block 103) and clears $T_D$ and $T_P$ (in block 104). Thereafter, control starts counting $T_P$ and $T_F$ again (in block 105) and checks whether $T_F \geq T_T/2$ (in block 106). If NO; that is, if $T_F<T_T/2$, control stands by (in block 106). If $T_F \geq T_T/2$, control stops counting $T_F$ (in block 107), calculates $R_r=1/(T_T \times 12)$ on the basis of the motor speed $R_r$ (in block 108), and checks whether n>50 (in block 109). Here, if NO; that is, if n≦50, control returns to block 90. Accordingly, until 50 seconds has elapsed after starting, the compressor speed $R_r$ is limited below $R_S$=30 (rps), so that the compressor will not be rotated at a high speed in the state where the lubricant temperature is relatively low.

In block 109, if YES; that is, if n>50, control checks whether the time $T_S$ is being counted (in block 110). If YES; that is, if being counted, control checks whether $T_S \geq 1$ (in block 111). If NO; that is, if $T_S<1$, control stops counting, clears counting, and jumps to block 92. If $T_S \geq 1$, control receives the command frequency $F_S$ from the indoor controller 21 (in block 112), and compares the command frequency $F_S$ with the actual speed $R_r$ (in block 113). In block 110, if NO; that is, if the time $T_S$ is not being counted, control starts counting the time $T_S$ (in block 114), receives the command frequency $F_S$ (in block 112), and compares the command frequency $F_S$ with the actual speed $R_r$ (motor frequency conversion). If the comparison result is $F_s > R_r$, control calculates $R_s = R_r + \Delta R$ (in block 115), and jumps to block 92. Further, If $F_s \leq R_r$, control checks whether $F_s < R_r$ (in block 116). If YES; that is, if $F_s < R_r$, control calculates $R_s = R_r - \Delta R$ (in block 117), and jumps to block 92. Further, In block 116, if NO; that is, if $F_s = R_r$, control jumps to block 92 without any correction. As described above, it is possible to shift the operation to the synchronous operation based upon the steady state voltage control.

Figure 7:
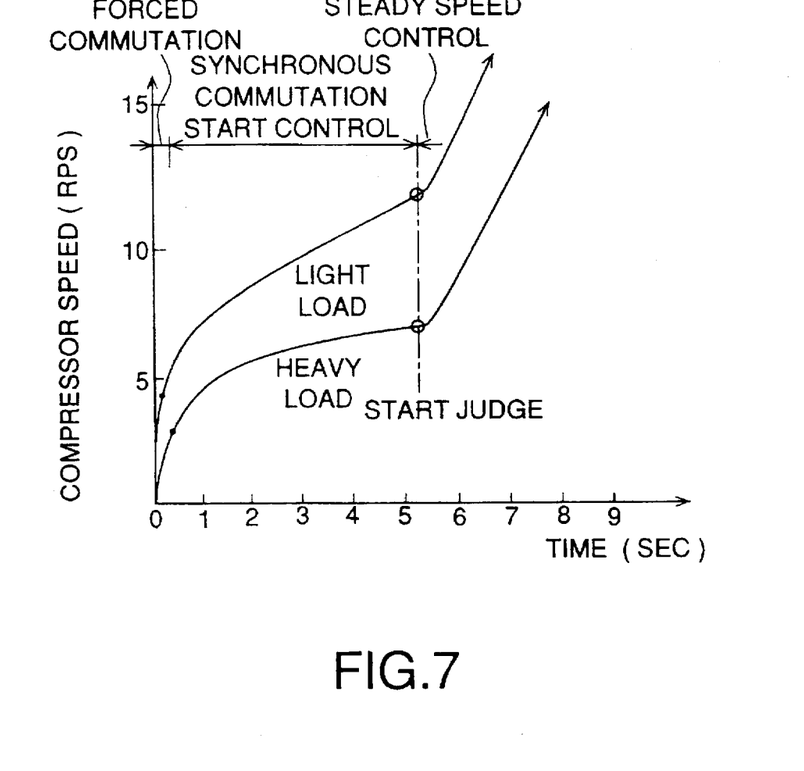
FIG. 7 is a graphical representation showing a change in speed of the compressor started in accordance with the starting control method according to the present invention.
Figure 8:
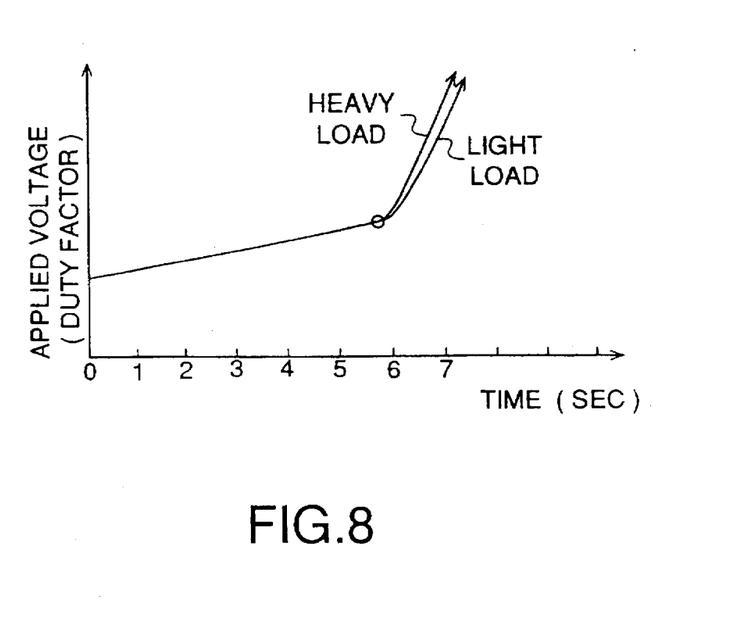
FIG. 8 is a graphical representation showing a change in voltage applied to the motor started in accordance with the starting control method according to the present invention.

FIG. 7 shows a typical compressor speed transition when the compressor is started in accordance with the control method according to the present invention, and FIG. 8 shows a typical motor voltage transition when the motor is started in the same way. Both the drawings indicate that in response to the starting command, the starting operation can be completed through the asynchronous forced commutation time interval (less than one second) and the synchronous commutation starting time interval (of several seconds), and thereafter the starting operation is shifted to the ordinary steady state speed control operation.

As described above, in the control method according to the present invention, it is possible to start the compressor without shock even under a light load. In contrast with this, under a heavy load, it is possible to start the motor by increasing the motor voltage gradually, thus decreasing the motor starting failure markedly.

What is claimed is:

1. A method of starting of a brushless motor for driving a compressor in a refrigerating cycle, comprising the steps of:
    a) driving the brushless motor in accordance with an operation mode of an asynchronous forced commutation operation at a non-zero fixed low frequency by increasing an applied voltage at an essentially constant rate within a certain voltage range, until one of: i) a rotational speed of the compressor exceeds a predetermined value after a starting operation commencement, or ii) a predetermined time has elapsed after the starting operation commencement;
    b) during the asynchronous forced commutation operation, detecting rotor position detection signals which are indicative of a rotational speed of the brushless motor and, when the rotor position detection signals are detected at a predetermined rate corresponding to synchronous commutation time intervals, shifting the operation mode from the asynchronous forced commutation operation to a synchronous commutation starting operation using the detected rotor position detection signals,
    wherein the synchronous commutation starting operation is not entered from the asynchronous forced commutation operation under any other circumstances;
    c) disenabling the detecting of the rotor position detection signals after the synchronous commutation starting operation;
    d) implementing the asynchronous forced commutation operation at the same synchronous commutation time intervals as those obtained during the detecting of the rotor position detection signals; and
    e) determining the starting operation completion, and thereby shifting the operation mode to a speed control operation according to a load to be air-conditioned, when at least one of the following three starting decision criteria is satisfied: that a rotational speed of the compressor reaches a first predetermined value; that the number of revolutions of the compressor exceeds a second predetermined value under the synchronous commutation starting operation; and that a first predetermined time has elapsed after the starting operation commencement.

2. The method of starting a brushless motor of claim 1, further comprising the step of:
    f) stopping the starting operation of the brushless motor because of an abnormality when at least one of the starting decision criteria is not satisfied within a predetermined time after the starting operation commencement.

3. The method of starting a brushless motor of claim 2, wherein in the step b), the synchronous forced commutation operation is implemented at a fixed low frequency.

4. The method of starting a brushless motor of claim 2, wherein in the step a), the applied voltage is adjusted according to a duty factor of a voltage pulse applied to the brushless motor.

5. The method of starting a brushless motor of claim 2, further comprising the steps of:
    g) after the starting operation commencement, starting the brushless motor by adjusting the applied voltage to the brushless motor;
    h) detecting an actual speed of the compressor when the starting operation completion is determined according to the three starting decision criteria; and
    i) controlling compressor speed according to the load to be air-conditioned by determining a frequency corresponding to the detected actual speed as an initial frequency.

6. A method of starting a brushless motor for driving a compressor in a refrigerating cycle, comprising the steps of:
    a) driving the brushless motor in accordance with an operation mode of an asynchronous forced commutation operation at a non-zero fixed low frequency by increasing an applied voltage at an essentially constant rate within a certain voltage range, until one of: i) a rotational speed of the compressor exceeds a predetermined value after a starting operation commencement, or ii) a predetermined time has elapsed after the starting operation commencement;
    b) during the asynchronous forced commutation operation, detecting rotor position detection signals which are indicative of a rotational speed of the brushless motor and, when the rotor position detection signals are detected at a predetermined rate corresponding synchronous commutation time intervals, shifting the operation mode from the asynchronous forced commutation operation to a synchronous commutation starting operation using the detected rotor position detection signals,
    wherein the synchronous commutation starting operation is not entered from the asynchronous forced commutation operation under any other circumstances;
    c) disenabling the detecting of the rotor position detection signals after the synchronous commutation starting operation;
    d) implementing the asynchronous forced commutation operation at the same synchronous commutation time intervals as those obtained during the detecting of the rotor position detection signals; and
    e) determining the starting operation completion when the following three starting decision criteria are all simultaneously satisfied at two separate instants in time after the starting operation commencement: that a rotational speed of the compressor reaches a first predetermined value; that the number of revolutions of the compressor exceeds a second predetermined value under the synchronous commutation starting operation; and that a first predetermined time has elapsed.

* * * * *